(12) United States Patent
Sandre et al.

(10) Patent No.: US 11,763,353 B2
(45) Date of Patent: Sep. 19, 2023

(54) SYSTEM AND METHOD FOR PICK-UP SENSING OF A PRODUCT

(71) Applicant: Wiliot, Ltd., Caesarea (IL)

(72) Inventors: Roberto Sandre, San Diego, CA (US); Mathieu Hoffmann, San Diego, CA (US); Yaroslav Ross, San Diego, CA (US); Stephen Statler, San Diego, CA (US); Tal Tamir, Even Yehuda (IL)

(73) Assignee: WILIOT, LTD., Caesarea (IL)

( * ) Notice: Subject to any disclaimer, the term of this patent is extended or adjusted under 35 U.S.C. 154(b) by 123 days.

(21) Appl. No.: 17/086,887

(22) Filed: Nov. 2, 2020

(65) Prior Publication Data

US 2021/0158405 A1 May 27, 2021

Related U.S. Application Data

(60) Provisional application No. 62/940,024, filed on Nov. 25, 2019.

(51) Int. Cl.
*G06Q 30/02* (2023.01)
*G06Q 30/018* (2023.01)
*G06Q 10/087* (2023.01)
*G06K 7/10* (2006.01)
*G06Q 30/0601* (2023.01)
(Continued)

(52) U.S. Cl.
CPC ..... *G06Q 30/0281* (2013.01); *G06K 7/10297* (2013.01); *G06Q 10/087* (2013.01); *G06Q 30/0185* (2013.01); *G06Q 30/0623* (2013.01); *G06Q 30/0639* (2013.01); *G16Y 40/30* (2020.01); *G06K 2007/10504* (2013.01);
(Continued)

(58) Field of Classification Search
CPC ..... G06Q 20/0281; G16Y 10/45; G16Y 20/10
See application file for complete search history.

(56) References Cited

U.S. PATENT DOCUMENTS 9,888,337 B1    2/2018   Zalewski et al.
10,140,820 B1   11/2018   Zalewski et al.
(Continued)

OTHER PUBLICATIONS

Wirecard teams with SES-imagotag on in-store electronic shelf label technology. (Oct. 8, 2019). Mobile Payments Today.News Features Retrieved from https://dialog.proquest.com/professional/docview/2302718197?accountid=131444 (Year: 2019).*

(Continued)

*Primary Examiner* — Michael Misiaszek
(74) *Attorney, Agent, or Firm* — M&B IP Analysts, LLC

(57) ABSTRACT

A system and method of detecting a pick-up of an item are provided. The method includes receiving at least one data packet from at least one IoT tag, extracting a frequency word from the at least one received data packet, wherein the frequency word is a measure of the at least one IoT, analyzing the frequency word to determine a pick-up event to be associated with a pick-up of the item attached to the at least one IoT tag, and upon detecting the pick-up event, sending a notification including an identification of the at least one IoT tag, wherein the notification incudes collateral product information associated with the picked-up item attached to the at least one IoT tag, and displaying the collateral product information of the picked-up item on a display on a physical location of the picked-up item.

19 Claims, 5 Drawing Sheets

(51) Int. Cl.
*G16Y 40/30* (2020.01)
*G16Y 20/10* (2020.01)
*G16Y 10/45* (2020.01)

(52) U.S. Cl.
CPC .......... *G06Q 30/0613* (2013.01); *G16Y 10/45* (2020.01); *G16Y 20/10* (2020.01)

(56) References Cited

U.S. PATENT DOCUMENTS

| | | |
|---|---|---|
| 10,142,822 B1 | 11/2018 | Zalewski et al. |
| 10,178,449 B1 | 1/2019 | Struhsaker |
| 10,355,730 B1 | 7/2019 | Zalewski et al. |
| 10,747,968 B2 | 8/2020 | Espinosa |
| 11,494,569 B2 | 11/2022 | Espinosa |
| 2006/0152369 A1* | 7/2006 | Reunamaki ........ G06K 19/0707 340/572.1 |
| 2008/0021766 A1* | 1/2008 | McElwaine .......... G06K 7/0008 340/630 |
| 2008/0224826 A1* | 9/2008 | Kuwako ............... G06K 7/0008 340/10.1 |
| 2010/0109852 A1* | 5/2010 | Bauchot ................. G06Q 10/06 340/10.51 |
| 2011/0199190 A1* | 8/2011 | Sano ................. G06K 7/10019 340/10.5 |
| 2015/0236551 A1 | 8/2015 | Shearer et al. |
| 2016/0307013 A1 | 10/2016 | Uysal et al. |
| 2017/0169264 A1* | 6/2017 | Britt ..................... G06Q 10/087 |
| 2017/0344935 A1 | 11/2017 | Mattingly et al. |
| 2017/0365157 A1 | 12/2017 | Shoari et al. |
| 2018/0208448 A1 | 7/2018 | Zimmerman et al. |
| 2018/0249735 A1 | 9/2018 | Espinosa |
| 2019/0116091 A1 | 4/2019 | Rao et al. |
| 2019/0150134 A1 | 5/2019 | Kakinada et al. |
| 2019/0188876 A1* | 6/2019 | Song ......................... G06T 7/70 |
| 2019/0347673 A1* | 11/2019 | Jung .................. G06Q 30/0201 |
| 2020/0104863 A1 | 4/2020 | Gupta et al. |
| 2020/0126125 A1* | 4/2020 | Sanjay ............... G06Q 30/0261 |
| 2020/0134652 A1 | 4/2020 | Deluca |
| 2020/0349328 A1 | 11/2020 | Espinosa |
| 2021/0027608 A1* | 1/2021 | Shakedd ................ G08B 21/24 |
| 2021/0035054 A1* | 2/2021 | Backhaus .............. G06Q 50/04 |
| 2021/0099881 A1 | 4/2021 | Loupos et al. |
| 2021/0104335 A1 | 4/2021 | Han et al. |
| 2021/0125143 A1 | 4/2021 | Bartlett |
| 2021/0174665 A1 | 6/2021 | Shoari et al. |

OTHER PUBLICATIONS

RFID could cost average Wal-Mart vendor $9M. Bowden, Bill. Arkansas Business21.15: 15(3). Journal Publishing, Inc. (Apr. 12, 2004) (Year: 2004).*

* cited by examiner

__US 11,763,353 B2__

SYSTEM AND METHOD FOR PICK-UP SENSING OF A PRODUCT

CROSS-REFERENCE TO RELATED APPLICATIONS

This application claims the benefit of U.S. Provisional Application No. 62/940,024, filed on Nov. 25, 2019, the contents of which are hereby incorporated by reference.

TECHNICAL FIELD

The present disclosure relates generally to a system and method for pick-up sensing of a product and providing content based on the sensed product pick-up, and more particularly, a battery-less pick-up sensing that triggers content to be displayed on a display.

BACKGROUND

The Internet of Things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that go beyond Machine-to-Machine (M2M) communications and covers a variety of protocols, domains, and applications.

IoT can be encapsulated in a wide variety of devices, such as heart monitoring implants, biochip transponders on farm animals, automobiles with built-in sensors, automation of lighting, Heating and Ventilation Air Conditioning (HVAC) systems, and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect data and transmit such data to a central controller. There are a few requirements to be met to allow widespread deployment of IoT devices. Such requirements include reliable communication links, low energy consumption, and low maintenance costs.

To this aim, an IoT device and wireless sensors are designed to support low power communication protocols, such as Bluetooth Low Energy (BLE), Long Range (LoRa) platform, and the like. To achieve low power consumption, at the physical layer, a wireless BLE-compliant device can be configured as a transmitter or a receiver. That is, a device can implement only a transmitter or a receiver. At the Link Layer, devices are divided into advertisers, scanners, slaves, and masters. An advertiser is a device that transmits packets; a scanner is a device that receives the advertiser's packets. A slave is connected with a master. Typically, advertisers and slaves have the lowest possible memory and processing burden, thus demonstrating low power (energy) consumption.

On the other hand, the scanners and masters perform most of the processing and, thus, are equipped with batteries, user interfaces, and possibly even an electricity supply. In an IoT network (i.e., a network of IoT devices), a typical design would be to shift most processing tasks from slaves to masters and from advertisers to scanners. Such a design would reduce the power consumption of the most resource-constrained devices, to the cost of the most resource-intensive devices.

That is, all electronic devices require a power source to operate. Even devices, such as low-power Internet of Things (IoT) devices, that are designed to support low power communication protocols operate using a battery (e.g., a coin battery). As an alternative to batteries, power supply may be harvested from other sources, such as light, mechanical movement, and electromagnetic power, e.g., existing Radio Frequency (RF) transmissions. The harvested power is stored in a rechargeable battery.

The current sensing solutions today rely on an ad-hoc sensor (accelerometer, gyroscope, etc.), in addition to a Bluetooth-capable System-on-Chip (SoC) to trigger via Bluetooth the activation of a remote display for product advertisement. The use of an external sensing element, or the encapsulation of an ad-hoc sensor on the SoC adds cost to the overall solution. Also, when using a BLE radio, an external crystal is used today to provide a timing and frequency reference for the BLE physical layer (PHY) modulation/demodulation, thus increasing the total cost of the solution as well as the space required for a final product integration. Finally, the combination of the pick-up sensing and Bluetooth radio requires today the use of a battery, which makes it unsuitable for an end product integration because of limited embeddability for several products. The integration of a battery to power the SoC, the external crystal and the sensor (if external) has also the disadvantage of maintenance, cost of battery replacement as well as disposition and recycling.

That is, the reliance on a power source such as a battery is a limiting factor for electronic devices due to cost, size, lack of durability to environmental effects, requires frequent replacement, and the like.

Also, in the case where a Radio Frequency Identification (RFID) tag is used to identify location of merchandise at a store, little besides location of the merchandise may be discerned. Merely knowing the location is of little use to both the consumer and the store owners alike. Also, special scanners and other equipment must be used, which involve a manual process and shopkeepers to spend their time in the information retrieval. This may lead to errors (if for instance, a certain area of the store is not scanned) and inefficiencies for store operations (as the shopkeepers could be assisting consumers).

Furthermore, when a consumer picks up a merchandise in a store, if the consumer wants to find out more about the merchandise, the consumer performs a separate search on his or her mobile device, or research further outside the store at home. Also, it is both inconvenient and difficult to compile information manually to inform the consumer about the merchandise, including any variations to the merchandise or any pricing besides what is advertised at the store.

On the store owner's side, it is difficult to track the merchandise, how effective store advertisement or merchandise placement is, or find out how popular a merchandise is beyond the point of sale.

In view of the above discussion, there is a need to provide a system that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a pick-up of an item. The method includes receiving at least one data packet from at least one IoT tag, extracting a frequency word from the at least one received data packet, wherein the frequency word is a measure of the at least one IoT, analyzing the frequency word to determine a pick-up event to be associated with a pick-up of the item attached to the at least one IoT tag, and upon detecting the pick-up event, sending a notification including an identification of the at least one IoT tag, wherein the notification incudes collateral product information associated with the picked-up item attached to the at least one IoT tag, and displaying the collateral product information of the picked-up item on a display on a physical location of the picked-up item.

Certain embodiments disclosed herein also include a non-transitory computer readable medium having stored thereon causing a processing circuitry to execute a process, the process includes receiving at least one data packet from at least one IoT tag, extracting a frequency word from the at least one received data packet, wherein the frequency word is a measure of the at least one IoT, analyzing the frequency word to determine a pick-up event to be associated with a pick-up of the item attached to the at least one IoT tag, and upon detecting the pick-up event, sending a notification including an identification of the at least one IoT tag, wherein the notification incudes collateral product information associated with the picked-up item attached to the at least one IoT tag, and displaying the collateral product information of the picked-up item on a display on a physical location of the picked-up item.

Certain embodiments disclosed herein also include a system for detecting a pick-up of an item. The system includes: a processing circuitry; and a memory, the memory containing instructions that, when executed by the processing circuitry, configure the system to receive at least one data packet from at least one IoT tag, extract a frequency word from the at least one received data packet, wherein the frequency word is a measure of the at least one IoT, analyze the frequency word to determine a pick-up event to be associated with a pick-up of the item attached to the at least one IoT tag, and upon detecting the pick-up event, send a notification including an identification of the at least one IoT tag, wherein the notification incudes collateral product information associated with the picked-up item attached to the at least one IoT tag, and display the collateral product information of the picked-up item on a display on a physical location of the picked-up item.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
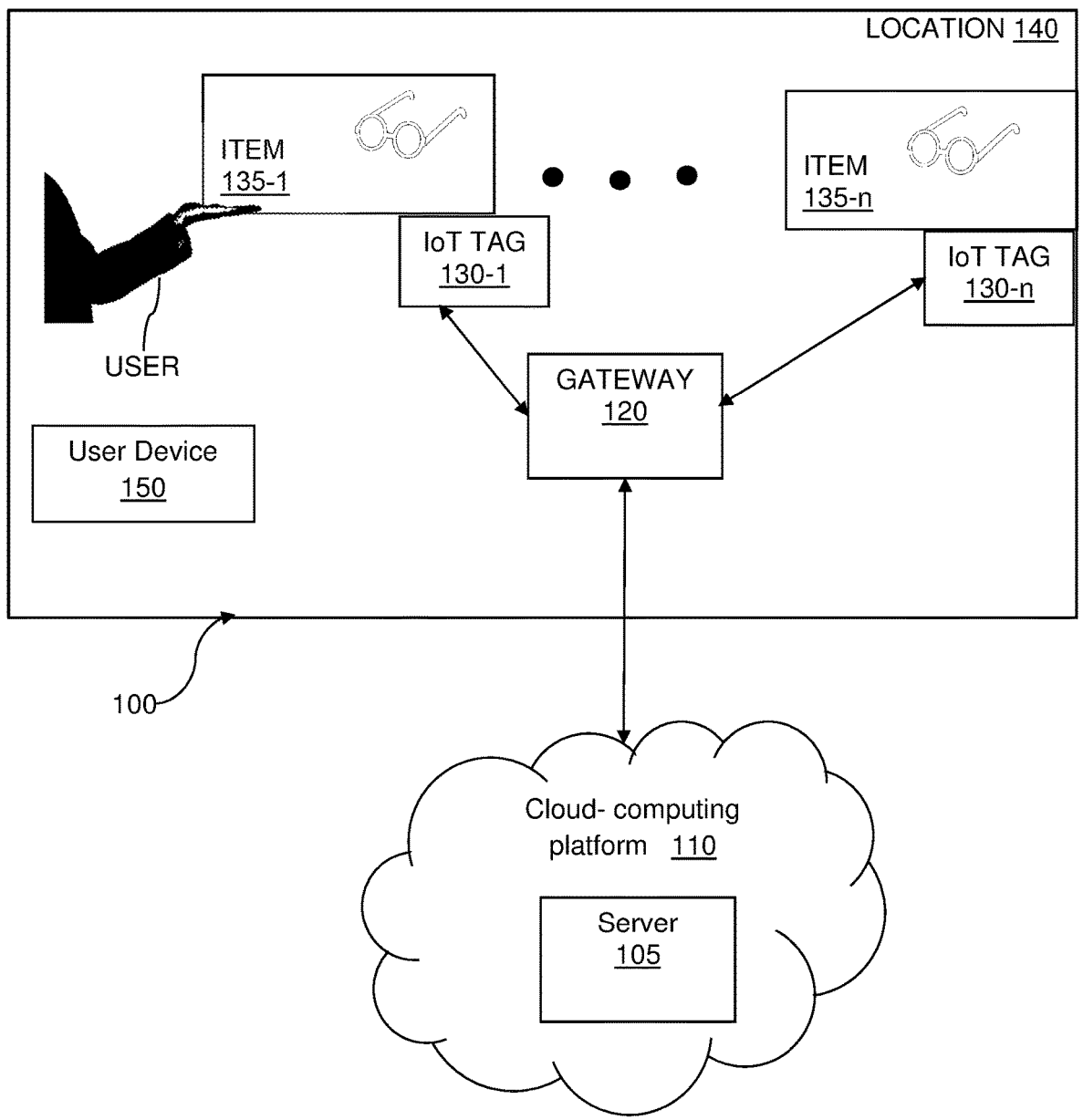
FIG. 1 is a schematic diagram of a pick-up detection system utilized for sensing pick-up of an item, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining a pick-up of an item. The method is performed by a system deployed, for example, in a cloud computing platform. The system is configured to process signals received from an Internet of Things (IoT) tag attached to the item. The IoT tag transmits the signals to a local gateway using a low-power communication protocol. The gateway relays the signals to the server over, for example, the Internet. In an embodiment, the IoT tag does not include any dedicated sensor to detect or otherwise sense pick up events.

As will be discussed in detail below, the system is configured to analyze the received signal detect or otherwise determine a pick-up event. Such an event indicates change in the physical location or orientation of the item monitored by a corresponding IoT tag. In an embodiment, a pick-up event is sent back to the gateway for activating the corresponding notification of pick-up on a remote screen close to the consumer in the store, or directly on the user smartphone (identified by among others by the consumer presence in the store and triangulating its proximity with the item being picked-up).

FIG. 1 is a schematic diagram of a pick-up detection system 100 utilized for sensing pick-up of an item according to an embodiment. The pick-up detection system 100 includes a server 105 that may be deployed in a cloud computing platform 110, and a gateway 120 within a location 140, which may be a store, for example. The gateway 120 may be part of a hand-held device, such as a smart phone, a tablet, or portable microcomputer, and the like.

Also shown in FIG. 1 is a user device 150. The user device 150 is a user in the location 140. The user device 150 may be, for example, a smart phone, a wearable computing device, a tablet computer, and the like. The user device 150 may be connectively connected to the gateway 120 over a wireless network (e.g., Wi-Fi), Bluetooth network, near-field communication, and the like.

The location 140 also includes a plurality of Internet of Things (IoT) tags 130-1 through 130-n (collectively referred to as an IoT tag 130 or IoT tags 130). The IoT tags 130 are respectively attached to a plurality of items 135-1 through 135-n (collectively referred to as an item 135 or items 135). An item 135 may be merchandise being sold at the store within location 140, for example. Each IoT tags 130 is directly attached to a respective item 135. The IoT tag 130 can be embedded in a price label or in the item itself (e.g., as part of the package). In some embodiments, the IoT tag 130 may be adhesive or printed on the item.

In operation, each of the IoT tags 130 respectively attached to the items 135 are in communication with the gateway 120 within the locations 140. The gateway 120 is also in communication with the server 105 (directly, or through a series of other gateways in combination). Communication between IoT tags 130 and the gateway 120 is performed using low-energy communication protocol. An example for such protocol includes a BLE, which are short-wavelength radio waves operating at a range of about 2.40 to 2.485 MHz, and commonly used among portable mobile devices.

In an embodiment, the IoT tags 130 sense a particular RF activity relative to each other at a certain coordinate location. Upon pick-up of one of the items 135, for example, item 135-1, the change of the coordinates within the location 140 leads to a change in an RF value detected by the IoT tag 130-1. As will be explained in more detail below, the IoT tag 130-1 sends the detected anomaly along with other information to the gateway 120. The gateway 120 relays the combined information to the server 105, which performs further processing, and sends the results back to the gateway 120 for viewing by a user of the user device 150.

The results may include contents product information regarding the item 135-1, such as videos, photos, or other information. The media content associated to such item may be displayed in a monitor located in proximity to where the merchandise is laid out, or directly to the consumer smartphone, identified because in proximity with the same item. In an embodiment, for example, pick-up analytics regarding the item 135-1 may additionally be sent.

It should be noted that the server 105 may be implemented as a physical machine, a virtual machine, or combination thereof. The cloud-based platform 110 may be a public cloud, a private cloud, or a hybrid cloud.

In another embodiment, each IoT tag 130 is configured to send data packet to the gateway 120. The information in such data packets is later processed by the server 105 to detect a pick-up event, i.e., that an item 135 attached a respective an IoT tag 130 was picked by the user. In an embodiment, a data packet includes a digital frequency word and an Identification (ID) of the IoT tag 130. The frequency word that is measured by an IoT tag 130 depends on a frequency calibration of the IoT tag 130. Any changes to the temperature in the ambient environment or changes in the location of the IoT tag 130 will remove the tag from synchronization, thereby would change the value of the frequency word. The frequency calibration is discussed in more detail with reference to FIG. 3.

Figure 2:
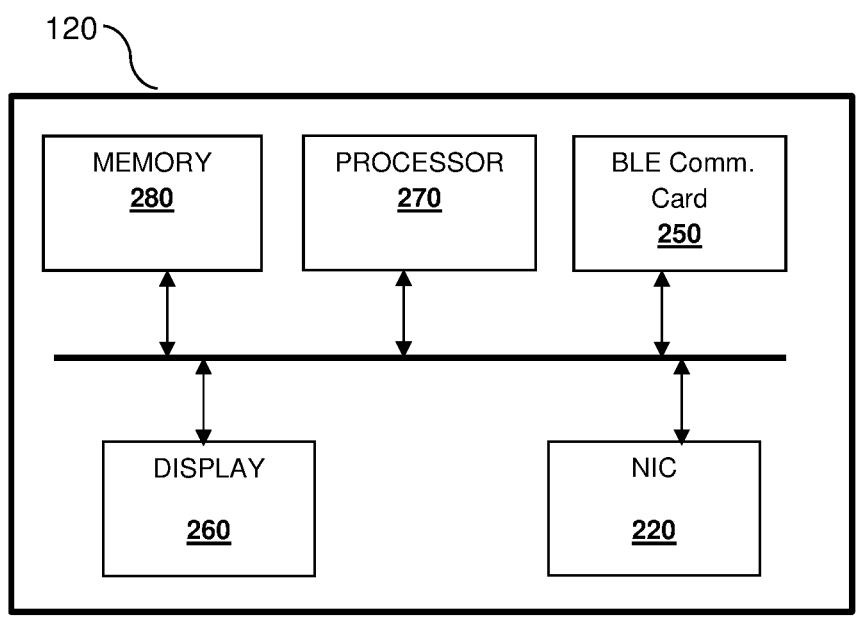
FIG. 2 is a detailed block diagram of a gateway utilized to collect signals from IoT tags according to an embodiment.

In an embodiment, the ID is a unique identifier (ID) of the tag created during production of the tag. The data packets sent by the IoT tags 130 are received at the gateway 120, which in turn, is configured to periodically send the data packets to the server 105. As illustrated in FIG. 2, the gateway 120 includes a BLE communication card 250 and a network interface card (NIC) 220, the BLE card 250 communicates with the IoT tags 130 over a BLE network (not shown), while the NIC 220 allows communication with the server 105 over the Internet (not shown), or other type of network.

In an embodiment, the gateway 120 may be installed with an agent or application executed by the processor 270 and stored in the memory 280. The agent, when executed, is configured to control the communication with the IoT tags 130 and the server 105. The agent is also configured to receive a pick-up event from the server 105 and display the respective notification of the display 260. For example, if a sunglass were picked, then a notification including information about the picked sunglass will be displayed.

It should be noted that processor 270 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 280 may be volatile (e.g., RAM, etc.), non-volatile (e.g., ROM, flash memory, etc.), or a combination thereof. The agent (or application) is realized in software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 270, cause the execution of the agent over the gateway 120.

Returning back to FIG. 1, the server 105 is configured to process the data packets received by the gateway 120 in order to detect a pick-up event for each of the IoT tag. A pick-up event may be indicative of:

Movement—the IoT tag 130 was physically moved from its previous location;

Touch—the IoT tag 130 was touched by someone or something;

Pickup—the IoT tag 130 was picked up from its location;

Drop—the IoT tag 130 was dropped;

Put down—the IoT tag 130 was placed back in a steady location; and

Proximity—the IoT tag 130 was neither moved nor touch, but there is someone or something in its proximity that has not been there before.

In an embodiment, the detection of a pick-up event is based on analysis of the digital frequency words. That is, if any change was determined respective previously received word, this is an indication that the location of the respective IoT tag was changed. The difference value between two consecutive received words can indicate on the type of change.

In the alternative, detection of RF values from multiple co-located IoT tags 130 may be analyzed within various temporal windows at a location 140 to determine which of the respective frequency words have anomalies. Co-location sensing may be detected by the gateway 120 within the common location 140. When stationary, the IoT tags 130 may have similarly sensed RF values.

In an embodiment, upon detection of a pick-up event, a pick-up notification is sent from the server 105 to the gateway 120. The pick-up notification includes an ID of the respective IoT tag 130 and information to be displayed. The information may include, for example, a description of the item associated with the tag, photos or videos about the item, prior customer reviews about the item, discounts, availability, or alternative designs of the item, and the like. The information to be included in the pick-up notification can be configured by the user (e.g. a store owner) through a web portal (not shown).

In an embodiment, the pick-up notification may serve as the trigger for the server 105 to retrieve more content associated with the item. Viewed in another way, the pick-up information and the IoT tag ID are pointers to the content associated with the item. The retrieved content is sent back to the gateway 120 by the server 105 to be displayed and viewed over the user device 150.

In an embodiment, the association between the user and the product is performed by triangulating the ID of the IoT tag 130 associated with the item 135 with the user device's 150 location presence in the store. In another embodiment, the association is performed by a two-factor identification where the IoT tag 130 associated with the item 135 is received by the server 105 sent via the gateway 120 and the user device 150, or using the user device 150 as the bridge to the server 105.

Figure 3:
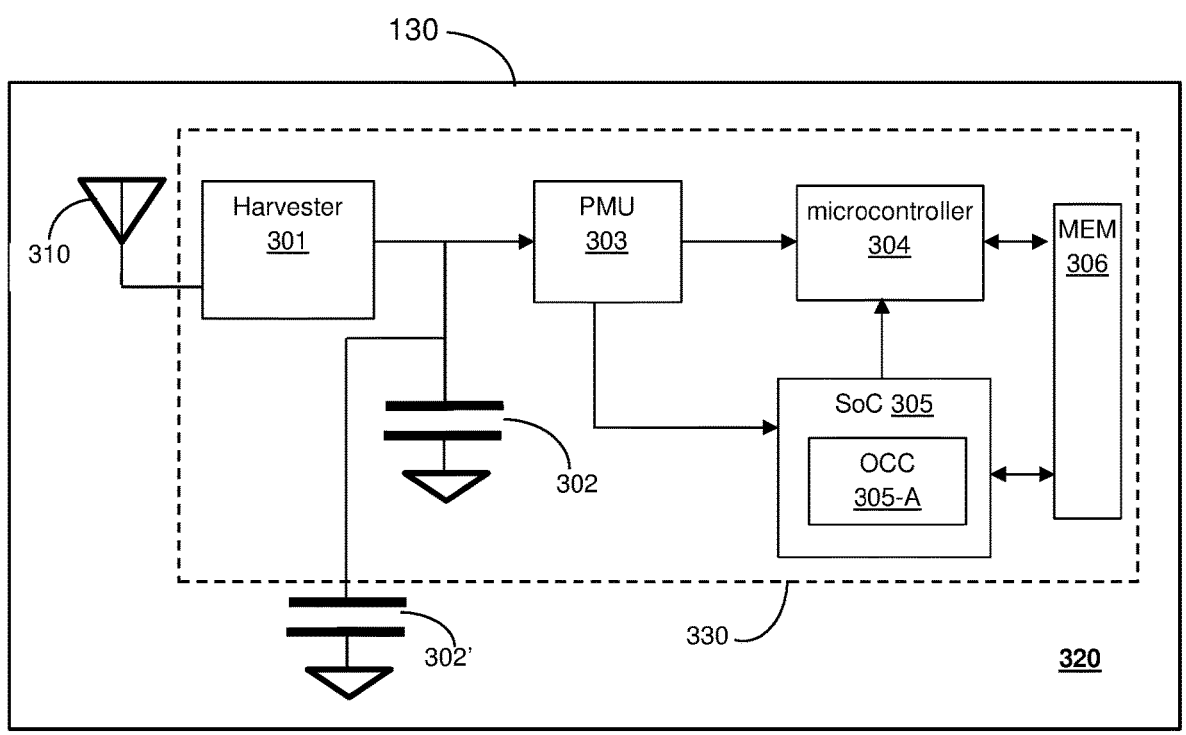
FIG. 3 is a schematic diagram of an IoT tag, according to an embodiment.

FIG. 3 shows an example schematic diagram of an IoT tag 130, designed according to the disclosed embodiments. The form factor of the IoT tag 130 is an on-die package-less. The IoT tag 130, as schematically demonstrated in FIG. 3, includes an energy harvester 301, coupled to an on-die capacitor 302 and an external passive capacitor 302', a power management unit (PMU) 303, a microcontroller 304, a system on chip (SoC) 305, and a retention memory 306. The IoT tag 130 further may include at least one antenna 310 glued to a substrate 320, for example. In another embodiment, the antenna 310 may be printed on the substrate or etched to the substrate. In a further embodiment, a passive external capacitor may take the place of the antenna 310.

In an embodiment, the substrate 320 is made of a low-cost material, such as, but not limited to, polyethylene (PET), polyimide (PI), and polystyrene (PS). In another embodiment, the substrate 320's pattern (layout) can be any of aluminum, copper, or silver. The glue utilized to glue to die and/or antenna 310 may be include materials such as an anisotropic conductive film (ACP), any type of conductive glue, solder past, and the like.

In the embodiment shown in FIG. 3, the antenna 310 is coupled to the harvester 301 and may be utilized for energy harvesting as well as wireless communication. In some embodiments, multiple antennas may be utilized to harvest energy at multiple frequency bands. Other embodiments may include one or more antenna for energy harvesting and an antenna to receive/transmit wireless signals at the BLE frequency band.

The SoC 305 includes a number of execution functions realized as analog circuits, digital circuits, or both. Examples for such execution functions are provided below. The SoC 305 is also configured to carry out processes independently or under the control of the microcontroller 304. Each process carried out by the SoC 305 also has a state, and processes can communicate with other processes through an IPC protocol. In the configuration illustrated in FIG. 3, the SoC 305 and/or the microcontroller 304 loads the context of processes and reads data from the retention memory 306.

The SoC 305 is partitioned into multiple power domains. Each power domain is a collection of gates powered by the same power and ground supply. To reduce the power consumption, only one power domain is turned on during execution. The SoC 305 can perform functions, such as reading from and writing to memory, e.g., of peripherals and can execute simple logic operations; tracking power level of the SoC 305; generating and preparing data packets for transmission; cyclic redundancy check (CRC) code generation; packet whitening; encrypting/decrypting and authentication of packets; converting data from parallel to serial; and staging the packet bits to the analog transmitter path for transmission.

In a preferred embodiment, the SoC 305 includes an oscillator calibration circuit (OCC) 305-A. The OCC 305-A includes at least one frequency locking circuit (FLC), each of which is coupled to an oscillator (both are not shown). The FLC calibrates the frequency of an oscillator using an over-the-air reference signal. In an embodiment, the calibration of the respective oscillator is performed immediately prior to a data transmission session and remains free running during the data transmission session. The FLC can be realized using frequency locked loop (FLL), a phased locked loop (PLL), and a delay locked loop (DLL). An example implementation of an oscillator calibration circuit 380 is discussed in U.S. patent application Ser. No. 15/994,388 to Yehezkely, assigned to the common assignee.

According to the disclosed embodiments, the energy harvester 301, the on-die capacitor 302, PMU 303, microcontroller 304, SoC 305, and the retention memory 306 are integrated in a die 330. The die 330 is glued to the substrate 320. The IoT tag 130 does not include any external DC power source, such as a battery.

In an embodiment, the microcontroller 304 implements electronic circuits (such as, memory, logic, RF, etc.) performing various functions allowing communication using a low energy (power) communication protocol. Examples for such a protocol includes, but are not limited to, Bluetooth®, LoRa, Wi-Gi®, nRF, DECT®, Zigbee®, Z-Wave, EnOcean, and the like. In a preferred embodiment, the microcontroller 304 operates using a Bluetooth Low energy (BLE) communication protocol.

In some embodiments, the microcontroller 304 is integrated with wireless sensors (not shown) to a complete an IoT device functionality.

The harvester 301 is configured to provide multiple voltage levels to the microcontroller 304, while maintaining a low loading DC dissipation value. In an example implementation, the energy harvester 301 may include a voltage multiplier coupled to the antenna 310. The voltage multiplier may be a Dickson multiplier, while the antenna is a 310 receive/transmit antenna of the microcontroller 304. That is, in such a configuration, the antenna is primarily designed to receive and/or transmit wireless signals according to the respective communication protocol of the low-energy IoT tag 130 (e.g., 2.400-2.4835 GHz signal for BLE communication).

It should be noted that the antenna 310 may also be designed for energy harvesting and may operate on a different frequency band, direction, or both, then those defined in the standard of the respective communication protocol. Regardless of the configuration, energy can be harvested from any wireless signals received over the air. Alternatively, energy can be harvested from any other sources, such as solar, piezoelectric signals, and the like. The harvested energy is stored in the on-die capacitor 302 and/or the external capacitor 302'.

The PMU 303 is coupled to the on-die capacitor 302 and is configured to regulate the power to the microcontroller 304 and SoC 305. Specifically, as the capacitance of the capacitor 302 is very limited, the power consumption should be carefully maintained. This maintenance is performed to avoid draining of the on-die capacitor 302, thus resetting the microcontroller 304. The PMU 303 can be realized using a Schmitt trigger that operates on a predefined threshold (Vref), e.g., Vref=0.85V.

In another embodiment, the PMU 303 may be further configured to provide multi-level voltage level indications to the microcontroller 304. Such indications allow the microcontroller 304 to determine the state of a voltage supply at any given moment when the on-die capacitor 302 charges or discharges. According to this embodiment, the PMU 303 may include a detection circuitry controlled by a controller. The detection circuity includes different voltage reference threshold detectors, where only a subset of such detectors is active at a given time to perform the detection.

The IoT tag 130 does not include any crystal oscillator providing a reference clock signal. According to an embodiment, the reference clock signal is generated using over-the-air signals received from the antenna 310. As noted above, in a typical deployment, a free running oscillator is locked via a phase-locked loop (PLL) to a clock, originating from a crystal oscillator. According to the disclosed embodiments, the OCC 305-A calibrates the frequency of an oscillator using an over-the-air reference signal. The oscillator(s) implemented in the IoT tag 130 are on-die oscillators and may be realized as a digitally controlled oscillator (DCO).

The retention memory 306 is a centralized area in the pick-up detection system 100 that is constantly powered. Data to be retained during low power states is located in the retention memory 306. In an embodiment, the retention area is optimized to subthreshold or near threshold voltage, e.g., 0.3V-0.4V. This allows for the reduction of the leakage of the retention cells.

Figure 4:
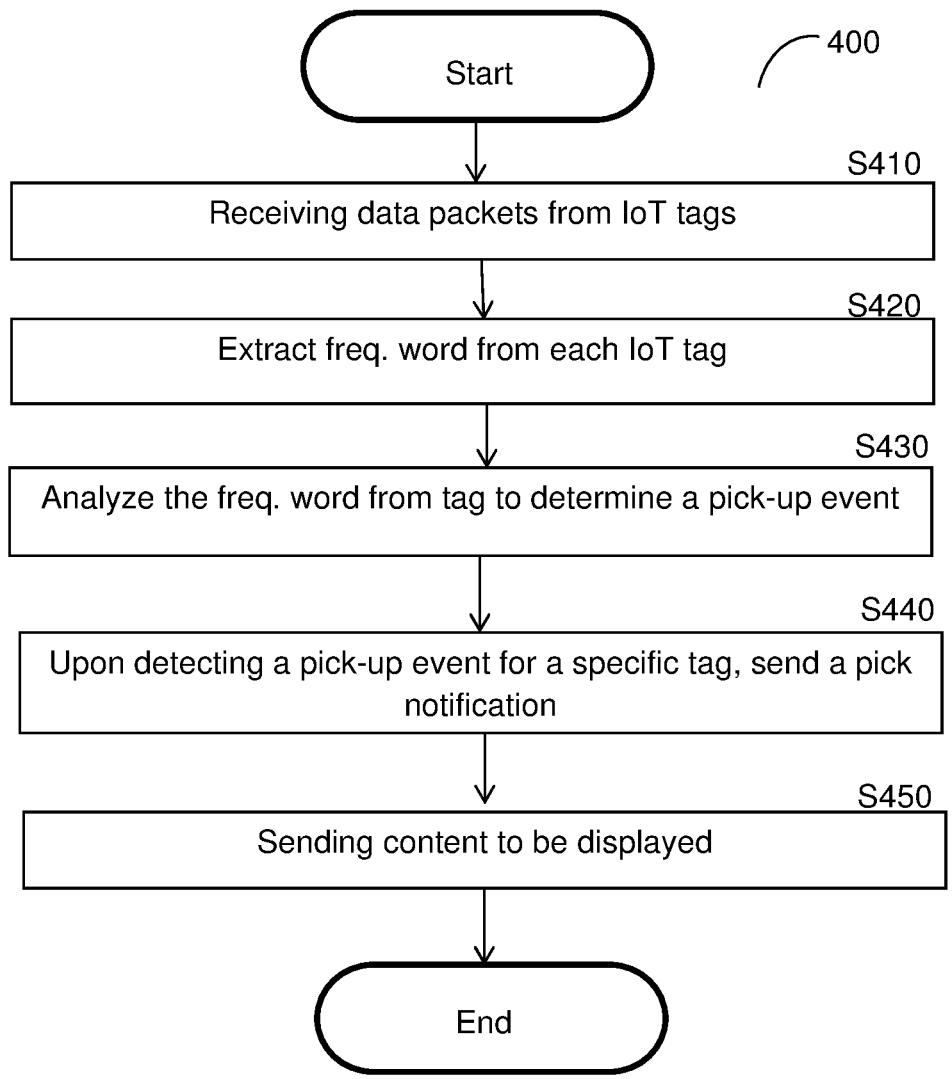
FIG. 4 is a flowchart for a method of detecting pick-up of an item, according to an embodiment.

FIG. 4 is an example flowchart 400 for a method of detecting pick-up of an item 135, according to an embodiment. The method, in an embodiment, is performed by the server 105.

At S410, data packets for each of the IoT tags 130 are received by the server 105. These data packets may be received periodically from IoT tags 130, via the gateway 120 over a NIC 220, for example. Each of the data packets include a digital frequency word of the IoT tag 130, and an ID of the IoT tag 130. The ID may be a serial number for the IoT tag 130.

Next, at S420, frequency words are retrieved from each IoT tag 130. The value of these frequency words depends on the frequency calibration of the IoT tag 130.

Further, at S430, the extracted frequency word is analyzed to determine a pick-up event. The pick-up event may occur due to temperature change at the location of the IoT tag 130, or location change for the IoT tag 130, which changes the value of the frequency word out of synchronization from previous measurements, and out of synchronization from the values of the other frequency words measured for the other IoT tags 130.

At S440, upon detection of a pick-up event for a specific IoT Tag 130, a pick-up notification may be sent from the server 105 to the gateway 120. Here, the pick-up notification includes an ID of the respective IoT tag 130 and information to be displayed. The information may include content information associated with the item 135, such as descriptions about the item 135, photos or videos about the item 135, prior customer reviews about the item 135, discounts, availability, or alternative designs of the item 135, and the like. In one way, the pick-up information and the IoT tag ID 130 serve as the trigger for the server 105 to retrieve more content associated with the item. Viewed in another way, the pick-up information and the IoT tag ID 130 are pointers to the content associated with the content.

At S450, the retrieved content is sent back to the gateway 120 by the server 105 to be displayed and viewed by the user on the display 260.

As an example, user may enter a store location 140. The user may see an item 135-1, in this case, a pair of glasses with black frame, and pick up the pair from among the items 135 of glasses. During this time, the IoT tag 130 detects the frequency word periodically, pairs the detected frequency word with the ID of the IoT tag and sends the information as converted data packet using BLE to the gateway 120. The gateway 120, upon receiving the paired information, relays the data packet to the server 105 using the NIC 220.

Upon receiving the IoT tag ID associated with the black framed glasses and the detected frequency word, the server 105 may then extract and analyze the frequency word to detect a pick-up event based on changes to the frequency word value due to movement. Upon detecting such a pick-up event, the server then sends a pick-up notification back to the gateway 120, which includes the ID of the IoT tag 130, and information to be displayed on the display 260 of the gateway 120. The information may include content information searched and retrieved by the server 105 over the cloud-computing platform 110 regarding the black framed glasses.

The displayed content information may include videos, photographs, specification description, prior customer reviews, alternative design and color information, possible discounts for the frame, availability of the black framed glasses at a different location, and the like. Once retrieved, the content information may then be sent back to user for viewing on a display 260 of the gateway 120.

With the above-described system, since the IoT tag 130 is battery-less and has an external bill of material list minimized, its size may be greatly reduced, such that the IoT tag 130 may more readily be attached to an item 135 at a location 140. Also, both the maintenance cost and time for the IoT tag 130 may be greatly reduced, as the need to replace batteries may be eliminated. Since there are no batteries to be disposed of, the system 100 is also more environmentally friendly compared to other devices where batteries are used.

Also, since only ambient RF energy at location 140 is detected by the at each of the IoT tags 130 and since BLE to communicate information from the IoT tag 130 to the gateway 120, energy consumption may be minimized. Additionally, since BLE, which is readily available in mobile devices and other set of end equipment such as access point, smart speakers, laptop computers, TV and monitors, is used to communicate information between the IoT tag 130 and the gateway 120, energy consumption may be minimized, and device compatibility between the IoT tag 130 and the mobile device housing the gateway 120 is readily assured. Therefore, the system as disclosed by the embodiments providing pick-up sensing may be economically implemented.

Further, since content information may be sent over the cloud-based platform 110 directly to the gateway 120 on a user's mobile device immediately upon pick-up detection of the item 135, additional advertisement, collateral product information, and available variations may be sent for the user's review. Thus, the user may make a more informed choice on whether to purchase the item 135, and may be able to further customize the selection of the item 135 in real time for purchase. Furthermore, the presence of monitors where the product information is displayed provide a form of digital shopping assistance which enables the customer a full virtual shopping experience: customers can see the relevant product information, compare different models and colors, see what is available in the store 140 or other affiliated stores, verify product authenticity and material, provenance, date and location of manufacturing, and so on. In other words, active consumer engagement with the store at location 140 may be enhanced with the above described pick-up discussed with reference to FIG. 1.

Figure 5:
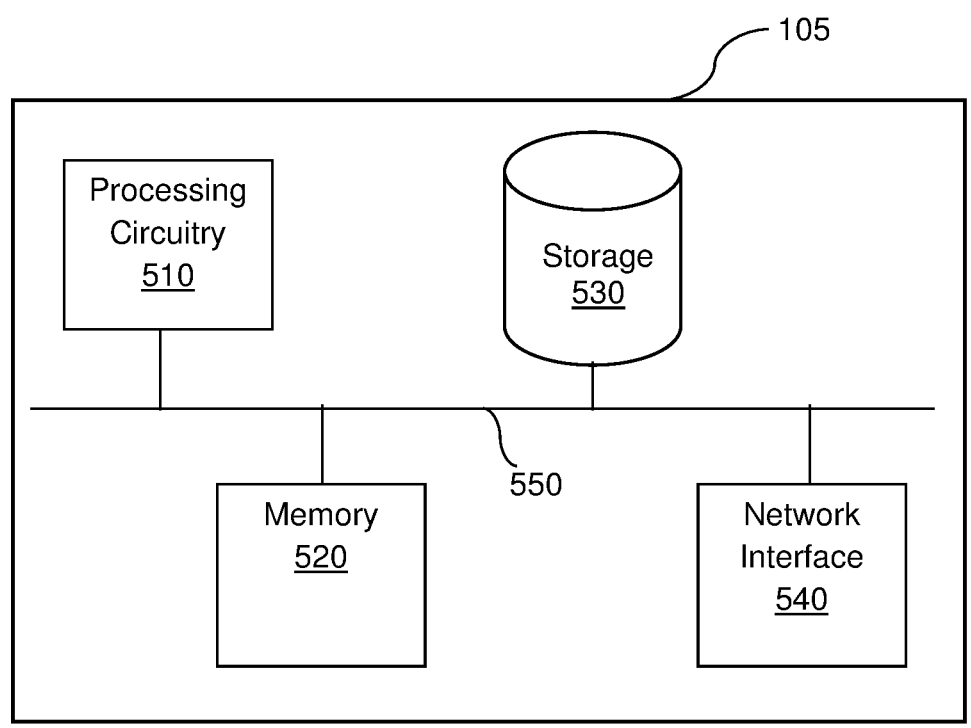
FIG. 5 is a schematic diagram of a server, according to an embodiment.

FIG. 5 is an example schematic diagram of the server 105 according to an embodiment. The server 105 includes a processing circuitry 510 coupled to a memory 520, a storage 530, and a network interface 540. In an embodiment, the components of the server 105 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof. In one configuration, computer readable instructions to implement one or more embodiments disclosed herein may be stored in the storage 530.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the server 105 to communicate with the gateway 120 for the purpose of, for example, receiving data, sending data, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for pick-up sensing of an item, comprising:
   receiving at least one data packet from at least one IoT tag;
   extracting a frequency word from the at least one received data packet, wherein the frequency word is a measure of a condition at the at least one IoT;
   analyzing the frequency word to determine a pick-up event to be associated with a pick-up of the item attached to the at least one IoT tag; and
   upon detecting the pick-up event:
   sending a notification including an identification of the at least one IoT tag, wherein the notification incudes collateral product information associated with the picked-up item attached to the at least one IoT tag; and
   displaying the collateral product information of the picked-up item on a display on a physical location of the picked-up item;
   wherein each frequency word extracted from the at least one received data packet is based on a frequency calibration performed at the IoT tag.

2. The method of claim 1, further comprising:
   detecting a pick-up event when the analyzed frequency word indicates a change in a value detected by the at least one IoT tag, compared to a previously received frequency word.

3. The method of claim 2, wherein the change in the value corresponds with a location change of the at least one IoT tag.

4. The method of claim 2, wherein the change in the value indicates that the extracted frequency word is out of synchronization from values of previous measurements of the frequency word.

5. The method of claim 2, wherein the change of the value indicates that the extracted frequency word is out of synchronization from values of other frequency words measured for other IoT tags.

6. The method of claim 1, wherein upon sending the notification including the identification of the at least one IoT tag, retrieving content associated with the item attached to the at least one IoT tag.

7. The method of claim 1, wherein the at least one data packet is received periodically from the at least one IoT tag via a gateway.

8. The method of claim 1, wherein the frequency word extracted from the at least one data packet is based on a reference clock signal, the reference clock signal being developed by the at least one IoT tag without using a crystal oscillator.

9. The method of claim 8, wherein the reference clock signal is developed at the at least one IoT tag based on an over-the-air signal received at the at least one IoT tag.

10. A non-transitory computer readable medium having stored thereon instructions for causing a processing circuitry to execute a process, the process comprising:
receiving at least one data packet from at least one IoT tag;
extracting a frequency word from the at least one received data packet, wherein the frequency word is a measure of a condition at the at least one IoT;
analyzing the frequency word to determine a pick-up event to be associated with a pick-up of an item attached to the at least one IoT tag; and
upon detecting the pick-up event:
sending a notification including an identification of the at least one IoT tag, wherein the notification incudes collateral product information associated with the picked-up item attached to the at least one IoT tag; and
displaying the collateral product information of the picked-up item on a display on a physical location of the picked-up item;
wherein each frequency word extracted from the at least one received data packet is based on a frequency calibration performed at the IoT tag.

11. A system for pick-up sensing of an item, comprising:
a processing circuitry; and
a memory, the memory containing instructions that, when executed by the processing circuitry, configure the system to:
receive at least one data packet from at least one IoT tag;
extract a frequency word from the at least one received data packet, wherein the frequency word is a measure of a condition at the at least one IoT;
analyze the frequency word to determine a pick-up event to be associated with a pick-up of the item attached to the at least one IoT tag; and
upon detecting the pick-up event:
send a notification including an identification of the at least one IoT tag, wherein the notification incudes collateral product information associated with the picked-up item attached to the at least one IoT tag; and
display the collateral product information of the picked-up item on a display on a physical location of the picked-up item;
wherein each frequency word extracted from the at least one received data packet is based on a frequency calibration performed at the IoT tag.

12. The system of claim 11, wherein the system is further configured to:
detecting a pick-up event when the analyzed frequency word indicates a change in a value detected by the at least one IoT tag, compared to a previously received frequency word.

13. The system of claim 12, wherein the change in the value corresponds with a location change of the at least one IoT tag.

14. The system of claim 12, wherein the change in the value indicates that the extracted frequency word is out of synchronization from values of previous measurements of the frequency word.

15. The system of claim 12, wherein the change of the value indicates that the extracted frequency word is out of synchronization from values of other frequency words measured for other IoT tags.

16. The system of claim 11, wherein upon sending the notification including the identification of the at least one IoT tag, retrieving content associated with the item attached to the at least one IoT tag.

17. The system of claim 11, wherein the at least one data packet is received periodically from the at least one IoT tag via a gateway.

18. The system of claim 11, wherein the frequency word extracted from the at least one data packet is based on a reference clock signal, the reference clock signal being developed by the at least one IoT tag without using a crystal oscillator.

19. The system of claim 11, wherein the reference clock signal is developed at the at least one IoT tag based on an over-the-air signal received at the at least one IoT tag.

* * * * *